United States Patent [19]

Sawa et al.

[11] 4,280,886

[45] Jul. 28, 1981

[54] METHOD FOR TREATMENT OF SEWAGE

[75] Inventors: Toshio Sawa; Masayoshi Kubota; Sankichi Takahashi; Toyohiko Kaneko, all of Ibaraki, Japan

[73] Assignee: Hitachi, Ltd., Tokyo, Japan

[21] Appl. No.: 60,477

[22] Filed: Jul. 25, 1979

[30] Foreign Application Priority Data

Mar. 22, 1979 [JP] Japan ................... 54-34592

[51] Int. Cl.³ .................. C02F 1/46; C02F 1/52
[52] U.S. Cl. ..................... 204/149; 204/152; 210/706
[58] Field of Search .......... 204/149, 152, 130; 210/705, 706, 707

[56] References Cited

U.S. PATENT DOCUMENTS

| | | | |
|---|---|---|---|
| 3,616,356 | 10/1971 | Roy | 204/152 |
| 3,664,951 | 5/1972 | Armstrong | 204/149 |
| 3,684,703 | 8/1972 | Marmo | 204/149 |
| 3,959,131 | 5/1976 | Ramirez | 204/149 |

*Primary Examiner*—T. M. Tufariello
*Attorney, Agent, or Firm*—Thomas E. Beall, Jr.

[57] ABSTRACT

The present invention relates to a method for removing suspended matter, organic matter, foaming matter and nitrogen compounds in sewage and to an apparatus for the method.

The suspended matter and the organic matter are removed by means of first fine bubbles and the foaming matter is removed by means of second bubbles having a larger bubble average diameter. The sewage treated by the first and second bubbles passes through a bed of porous adsorbent polarized by the feed of current, so that nitrogen compounds and the organic matter remained in the sewage are adsorbed and removed. It is also provided with a step for removing the suspended matter and the organic matter remained in the sewage by means of third fine bubbles before transferring the sewage to the bed of adsorbent.

17 Claims, 8 Drawing Figures

METHOD FOR TREATMENT OF SEWAGE

BACKGROUND OF THE INVENTION

1. Field of the Invention

This invention relates to a method for a treatment of sewage or waste water to re-use as a water and to an apparatus for the method. More particularly, the invention relates to a method for a treatment of sewage to remove suspended matter, organic matter, foaming matter and so on contained in the sewage, and also to an apparatus for the method.

2. Description of the Prior Art

In recent years, ration of the supply of the city water as well as restriction of the sewage have been tightened and re-use of the water has become all the more necessary especially in urban communities. Under such circumstances, a concentrated purification installation and a water re-use recycling system have been used in newly constructed buildings in cities or in housing developments partly because of absence of sufficient sewage system capable of processing great quantities of sewage. Such recyling systems are referred to as a "re-use system" or as a "water re-use processing system" in contast with the conventional water supply and sewage systems.

Applications of the reused water are versatile and varied. At present, however, the reused water is used in the fields such as flush water for flush toilets, water for air-conditioning, water for car cleaning and water for leisure applications.

As a general standard for the water quality, it has been believed necessary that the reused water should contain, in the case of the flush water for the flush toilets, up to 10 ppm of suspended matter, up to 20 ppm of organic matter, up to 5 ppm of foaming matter, up to 20 ppm of nitrogen compounds and desirably the number of *Escherichia coli* of up to 1,000/ml. When the reused water is used for air-conditioning, car cleaning or leisure purposes, it is believed necessary as the water quality standard that the water should contain up to 5 ppm of suspended matter, up to 10 ppm of organic matter, up to 1 ppm of foaming matter, up to 10 ppm of nitrogen compounds and the number of *Escherichia coli* of up to 1,000/ml.

The water re-use processing systems that have so far been proposed to satisfy the abovementioned water quality standards consist principally of a biochemical processing or a physicochemical processing. The former comprises, as a principal method, an active sludge method and a spray filtration bed method used in the conventional sewage processing in combination with a foam sedimentation-separation method and (or) a sand filtration method. However, this processing system involves the drawback in that the installation space is large and the processing speed is slow.

For the abovementioned reason, the latter using the physicochemical processing method has been attempted.

As disclosed in Japanese Patent Laid-Open No. 89676/1974, removing first suspended matter by electrolytic floating and separation, carrying out then again the floating separation to remove the rest of suspended matter and thereafter decomposing organic matter having COD or BOD by means of the electrolytic oxidation. Though this method uses two water processing methods, i.e., the floating-separation method and the electrolytic oxidation method, the method has not yet come to provide sufficient effects as a water re-use system and to satisfy the aforementioned water quality standards.

SUMMARY OF THE INVENTION

The present invention is directed to cope with the abovementioned problems and an object of the invention is to provide a water-re-use processing method of sewage and an apparatus for the method capable of effectively removing the suspended matter, organic matter, foaming matter and nitrogen compounds, and capable of increasing the processing speed by a continuous treatment of the sewage.

As an additional object to the apparatus of the invention, the present invention contemplates to provide a water re-use processing apparatus having a reduced size calling for a simple operation management in consideration of a specific requirement that the apparatus be placed inside a building in the city.

One characteristic of the invention is to float and separate the suspended matter, organic matter and foaming matter in the sewage by using two kinds of bubbles suitable to the treatment of the abovementioned matters. The inventors of the present invention have acquired the following findings as a result of repetition of experiments. First, though the pressurizing floating-separation method is effective for removing the suspended matter and organic matter because it provides fine air bubbles having bubble diameters in the range of 50–150 $\mu$m, it is not effective for removing the foaming matter. Next, though the foam floating-separation method does not provide a sufficient effect for removing the suspended matter and organic matter because the air bubbles are coarse as large as 1–5 mm, it provides extremely remarkable effects for removing the foaming matter. Further, since the electrolytic floating-separation method uses bubbles having a bubble diameter of 100–200 $\mu$m, it provides a considerable and practical effect for removing the suspended matter and the organic matter but its effect is not equal to the pressurizing floating-separation method using finer air bubbles.

Consequently, the inventors of the present invention have reached the water re-use proceeding method by effectively combining two or more different floating-separation methods.

Another characteristic of the invention is to provide the water reuse processing method by effectively combining the third treatment comprising, after removing the suspended matter, organic matter and foaming matter in the sewage by combining two or more different floating-separation methods, the step of passing the treated sewage through a bed of an electrically conductive porous adsorbent packed between support electrodes consisting of at least one pair of anode and cathode, feeding a d.c. current through the support electrodes, allowing the porous adsorbent polarized by the feed of current to adsorb nitrogen compounds in the treated sewage and thus removing them therefrom.

DETAILED DESCRIPTION OF THE PREFERRED EMBODIMENTS

The method and the apparatus of the present invention will be explained in detail by referring to the accompanying drawings.

Figure 1:
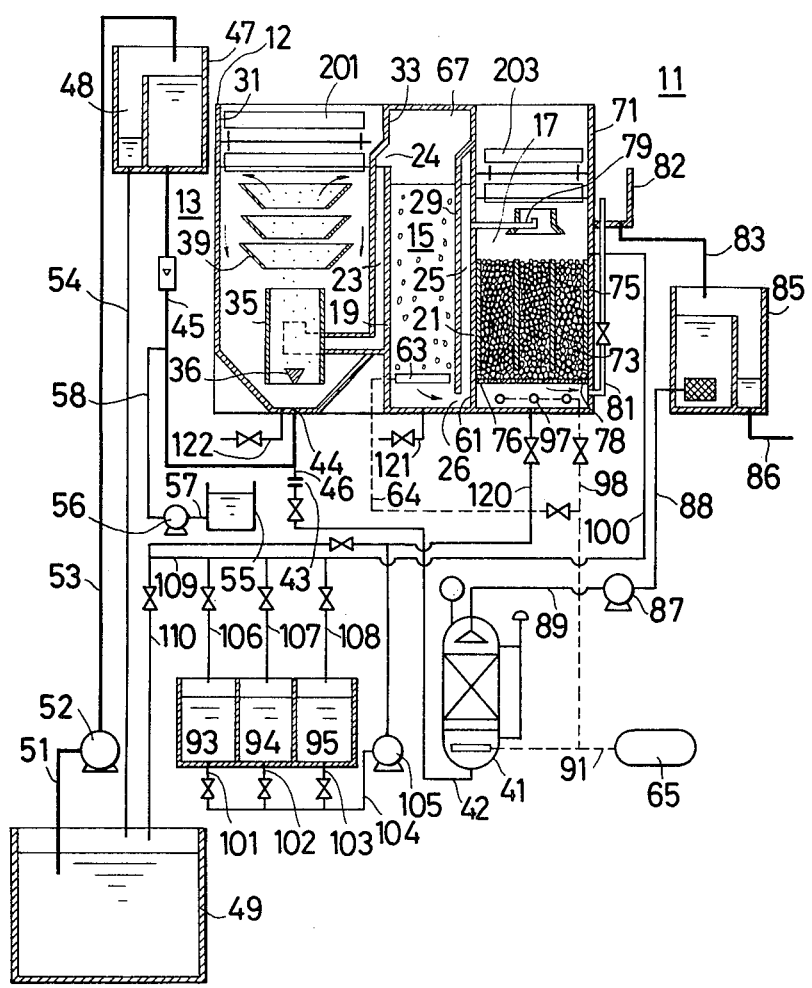
FIG. 1 is a view illustrating a system of the present invention.
Figure 2:
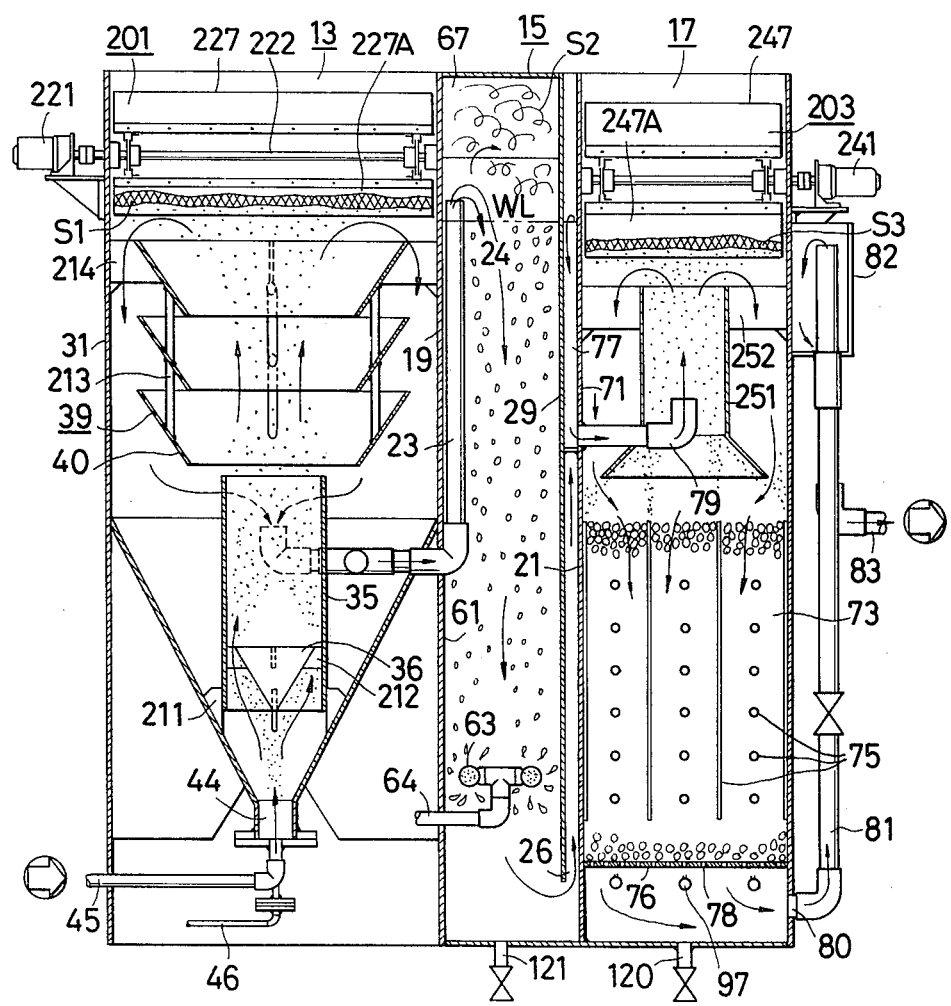
FIG. 2 is a front view, including a partial sectional view, illustrating a main portion of the system of FIG. 1 in detail.
Figure 3:
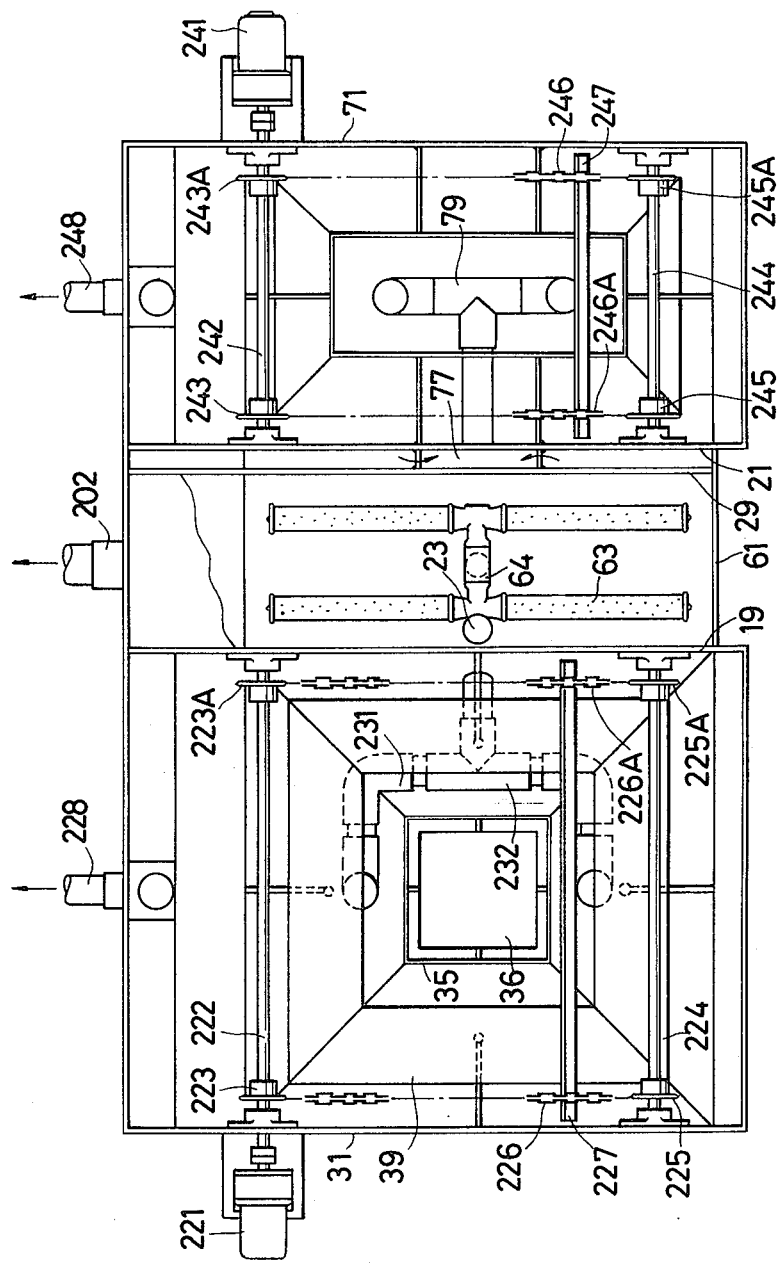
FIG. 3 is a plane view of FIG. 2, FIGS. 4–7 are graphical views showing experimental results.

Referring to FIG. 1 illustrating a whole system of the present invention and FIGS. 2 and 3 illustrating a main portion of the system in FIG. 1, a processing device 11 comprises a pressurizing-separation device 13, a foam floating-separation device 15 and a packed electrolytic floating-separation device 17. These three devices are installed by combining with each other in a body 12. The pressurizing-separation device 11 and the foam floating-separation device are decided by a partition 19 and the foam floating-separation device 15 and the packed electrolytic floating separation device 17 are divided by a partition 21. A sewage conduit 25 is made by using a pipe 23 and the partition 21, this is, made together with a plate 29 installed in a foam-floating-separation tank 33.

The pressurizing floating-separation device 13 comprises a pressurizing floating-separation tank 31, a mixing cylinder 35 mounted in the tank 31, a bubble dispersing plate 36 mounted in a lower portion of the cylinder 35, a floc growth-promoting device 39 disposed in the descending flow zone near the tank wall, a pressurized water production apparatus 41 and a pressure reduction device 43 connected to the pressurized water production apparatus 41 through a conduit 42. A floating flocs collecting chamber is formed in an upper portion of the tank. A sewage intake port 44 is formed at the end portion of the tank 31 and the port 44 is connected with a sedimentation sand tank 47. The sewage collected in a reservoir tank 49 is conducted to the sedimentation sand tank 47 through a conduit 51, a pump 52 and a conduit 53. An over-flowed sewage flows to an over-flowed chamber 48 and returns to the reservoir tank 49 through a conduit 54. Flocculant reserved in a flocculant tank 55 is conducted into a conduit 45 through a pump 56 and conduits 57, 58. The conduit 45 is connected with the pressure reduction device 43 by means of a conduit 46.

The foam floating-separation device 15 comprises a foam floating-separation tank 61, an air spray tube 63 with a number of small apertures and an air source tank 65 connected with the tube 63 through a conduit 64. A floating foam collecting chamber 67 is formed in the upper portion of the tank 61.

The packed electrolytic floating-separation device mainly comprises a processing tank 71 in which a floating zone is formed at the upper portion and an electrolysis zone is formed at the lower portion, a bed 73 of granular active carbon packed in the processing tank 71 as the electrically conductive porous adsorbent forming the electrolysis zone and a plurality of support electrodes 75 of horizontally and vertically disposed anodes and cathode among the bed 73. The active carbon bed 73 and the support electrodes 75 are supported by a support plate 76 mounted on the processing tank 71. The support plate 76 is provided with a number of small apertures 78 for passing the treated sewage. A dispersing water tube 79 which is connected with a sewage intake port 77 is disposed in the floating zone of the processing tank 71 in such a way that the sewage is conducted to the packed electlytic floating-separation device 17.

The treated water is temporarily reserved in a reservoir tank 85 by means of a conduit 81, a take-out tank 82 and a conduit 83 and, after that, is provided for the utilization as a re-use water. One portion of the treated water pressurized by a pump 87 is sent to the pressurized water production apparatus 41 through conduits 88, 89 to contact with air conducted from the air source tank 65 through a conduit 91 and, after that, recycled to the pressurized floating-separation device 13. The rest of treated water is discharged from a conduit 86 for a re-use of water as abovementioned.

As already described, the electrolytic floating-separation device 17 performs the purification of the sewage by means of adsorption of the adsorbent such as the active carbon. If the device is kept used continuously, the suspended matter and foaming matter attach to the surface of the adsorbent and close its fine pores, thereby lowering the adsorption capacity. In order to prevent this trouble, the adsorbent is washed, i.e., so-called regeneration is carried out after a predetermined period of use. Washing for regeneration comprises the three steps, i.e., the first step of washing with water and an acid, the second step of feeding a current while causing an electrolyte such as NaCl to flow and the third step of electrolytic washing. Tanks 93, 94, 95 respectively store the water, the acid and the electrolyte. In performing the washing with water, it is preferrable to carry out a bubble washing similtaneously. For this purpose, a pressurized air is transferred from an air spray tube 97 from the air source tank 65 through a conduit 98.

In performing the regeneration of the adsorbent, the water, the acid and the electrolyte are, in turn, transferred to the lower portion of the processing tank 71 though conduits 101, 102, 103, 104, a pump 105 and a conduit 120.

The water, the acid and the electrolytic used for the washing with water, acid and electrolyte are, in turn, returned to the tanks 93, 94, 95 by means of conduits 100, 106, 107, 108.

The primary washing water is returned to the reservoir tank 49 through a conduit 109, 110. When discharging from the tanks 13, 15, 17, the sewage is discharged through conduits 120, 121, 122 connected with the bottom of each tank.

According to the abovementioned embodiment, it is possible to produce an apparatus having excellent water re-use processing efficiency in a compact style. In addition, since the sewage after the addition of the flocculant can be allowed to flow without using a pump, the apparatus is free of the possible problem of breakage of the flocs and enhances its floating-separation performance. Further, the apparatus is extremely advantageous also from the aspect of its maintenance because dilution treatment of the toxic gases is possible.

In the apparatus of the present invention, the sewage subjected to the primary treatment using the sedimentation sand is first stored in the tank 47. The flocculant is then added to the sewage by the flocculant addition tank 55. The sewage reaches the pressurizing floating device 13 while forming flocs due to the flocculation.

In the floating zone, the sewage is introduced from the intake port together with fine bubbles of 50–200 μm, preferably which are formed by returning the pressurized water of 2–5 atg dissolving therein the air pressure-fed in the pressurizing water production apparatus 41 by means of the pressure reduction device 43 to the normal pressure, and they are mixed with each other by means of the bubble spray plate 36. In this manner, the suspended matter and the organic matter contained in the sewage are mixed with the flocculant, turned into flocs and rise up in the floating zone while attaching to, and being carried over, by the bubbles. The descending flocs that can now complete the rise are gathered mutually into now flocs by the growth-promating device 39 and then float upward.

The scum SI thus floated is caused to overflow for removal by a suitable scraping means such as a scum skimmer 201. The separated water is transferred to the foam floating-separation device 15 passed through the piping 23. In the foam floating-separation device 15, an intake port 24 for the sewage is formed at the upper portion of the tank 61 and an take-out port 26 is formed at the bottom thereof. The floating zone is formed above the air spray tube 63. A number of small apertures of 100–200 μm are bored on the air spray tube 63 and the air transferred through the conduit 64 is turned into bubbles of 1–5 mm from these apertures and rises in the floating zone. Because of the bubbles, the foaming matter in the sewage is turned into foams together with the introduced bubbles and float up on the water level (W.L.). The foam thus floated is caused to overflow for removal from a take-out port 202 as a condensed water containing foam forming materials. The separated water processed in this manner is taken out from a piping 121, applied with chlorine sterlization and then used as the flush water for the flush toilet.

For the purpose of third treatment for the sewage, the rest of the separated water flows through the piping 25 and is led into the packed electrolytic floating-separation device 17.

The packed electrolytic floating-separation device 17 comprises the tank 71 equipped at its upper portion with an intake port 77 and at its lower portion with tank-out ports 78. Inside the processing tank 71, there are formed the floating zone at the upper portion and the electrolysis zone at the lower portion. The sewage entering the processing tank 71 from the intake port 77 first descends into the electrolysis zone through the floating zone. Granular active carbon 73 as the electrically conductive porous adsorbent is packed between the support electrodes 75 and a d.c. current is caused to flow through it from a power source (not shown) so that bubbles of a diameter of 100–200 μm of hydrogen and oxygen formed by the electrolysis further carry over and float the residual suspended matter and organic matter in the sewage. The scum S3 thus floated is caused to overflow for removal in the same manner as the scum S1 by a skimmer 203. On the other hand, the granular active carbon of bed 73 polarized by the feed of the current adsorbs the organic matter, the nitrogen oxides and the metal ions in the sewage. Chlorine formed by the discharge and present in the form of iron in the sewage sterlizes bacteria such as Escherichia coli contained in the sewage.

The processed water treated in this manner is discharged from the take-out ports 78 through the conduit 81, the take-out tank 82, the conduit 83 to the reservoir tank 85 and used as the re-use water.

In FIGS. 2 and 3, the mixing cylinder 35 is mounted on the tank 31 by a supporting plate 211 and the bubble dispersing plate 36 is mounted on the inner wall of the mixing cylinder 35 by plate 212. The floc growth-promoting device 39 comprises three conical cylinders 40 which are made integral by supporting bars 213, and is mounted on the inner wall of the tank 31 by a supporting plate 214.

The skimmer 201 comprises a driving shaft 222 connected with a motor 221, a pair of chain driving gears 223, 223A mounted on the driving shaft 222, a driven shaft 224, a pair of chain gears 225, 225A mounted on the driven shaft 224, a pair of chains 226, 226A driven by engaging with the chain gears and skimming plates 227, 227A connected with the chains. The scum S1 skimmed by the skimming plates 227, 227A is taken out from a take-out port 228. The piping 23 is connected with the divided sewage intake pipings 231, 232 which are open aside of the mixing cylinder 35. The skimmer 203 comprises a driving shaft 242 connected with a motor 241, a pair of chain driving gears 243, 243A mounted on the driving shaft 242, a driven shaft 244, a pair of chain gears 245, 245A mounted on the driven shaft 244, a pair of chains 246, 246A driven by the chain gears and skimming plates 247, 247A connected with the chains and the scum of suspended matter and the organic matter S3 skimmed by the skimming plates 247, 247A is taken out from a take-out port 248.

In the floating zone of the tank 71, a cylinder 251 is disposed by mounting on the inner wall of the tank 71 by a supporting plate 252 and the piping 79 is open upwardly in the rectifining cylinder 251.

Next, the explanation will be given on the method of the present invention and the operating conditions of the apparatus of the invention.

Figure 4:
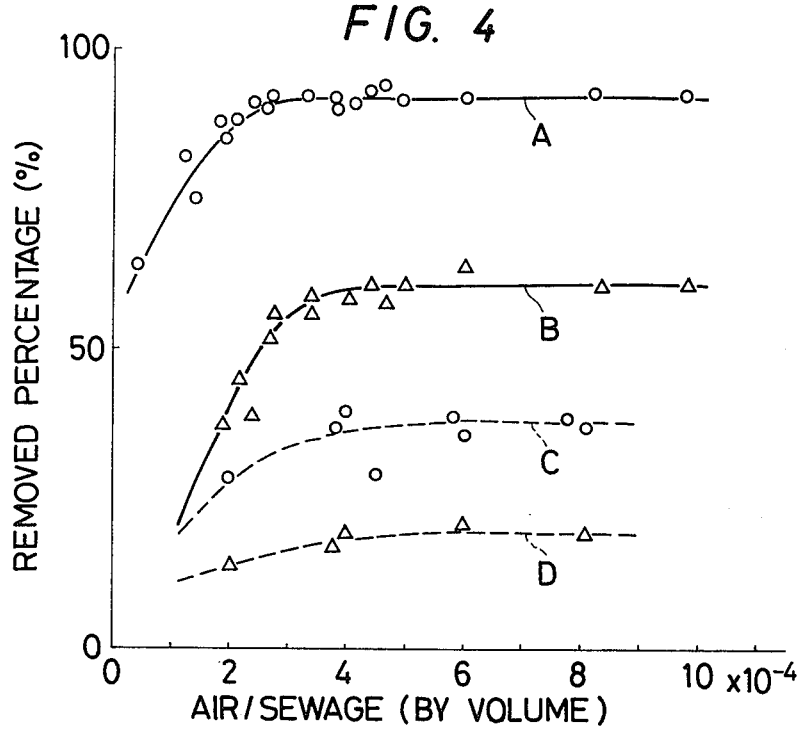

The inflow water of a sewage plant is used as the sewage sample and is passed through the pressurizing floating-separation device at a rate of 400 l/hr. The flocculant used is polyaluminum chloride, which is added in an amount of 5 ppm, calculated as aluminum. The pressurized water has a pressure of 3 atg and dissolves therein the air near the saturation. The quantity of pressurized water is changed so as to measure the removing percentage of the suspended matter with the results shown in FIG. 4. The term "air/sewage" in FIG. 4 represents a volume ratio of the air quantity and the sewage quantity. In FIG. 4, a curve A represents a removing percentage (%) when the suspended matter is contained 150 ppm in the sewage, a curve B represents a removing percentage when the organic matter is contained 100 ppm in the sewage, a curve C represents a removing percentage when the suspended matter is contained 20 ppm in the sewage and a curve D represents a removing percentage when the organic matter is contained 15 ppm in the sewage. As being apparent from the FIG. 4, it is possible to cause the suspended matter and organic matter to attach to the bubbles and to float, and to result in obtaining a satisfactory removing percentage by providing the bubbles of $1 \times 10^{-4}$ on the basis of the sewage by volume. The inventors have discovered that the range of $1 \times 10^{-4} - 1 \times 10^{-2}$ is practical through their experiments. Also, the inventors have discovered that the range of $1.5 \times 10^{-4} - 10^{-4}$ is recommendable to remove the suspended matter and the organic matter. In addition, the inventors have discovered that the range of $2 \times 10^{-4} - 4 \times 10^{-4}$ can most effectively remove the suspended matter and the organic matter.

Furthermore, they have discovered that, regarding an amount of electrolysis bubbles to be provided in the third treatment, the range of $0.5 \times 10^{-4} - 2 \times 10^{-4}$ is practical to effectively remove the suspended matter and the organic matter.

Figure 5:
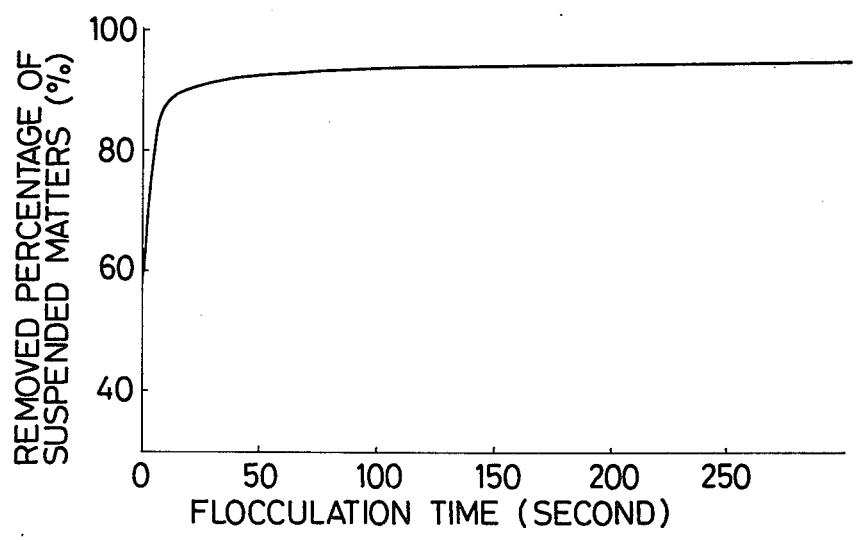

The removing percentage of the suspended matter is measured by the use of the same sample sewage and the same flocculant as those used in the above example while changing the time from the addition of the flocculant till the introduction of the bubbles. The results are shown in FIG. 5. As can be seen clearly from this chart, it is found effective to introduce the bubbles with a time interval of at least 10 seconds from the addition of the flocculant so as to effect floating-separation. Incidentally, the colloidal stability of the flocs of the suspended matter at this time is found about 40% by measurement.

Figure 6:
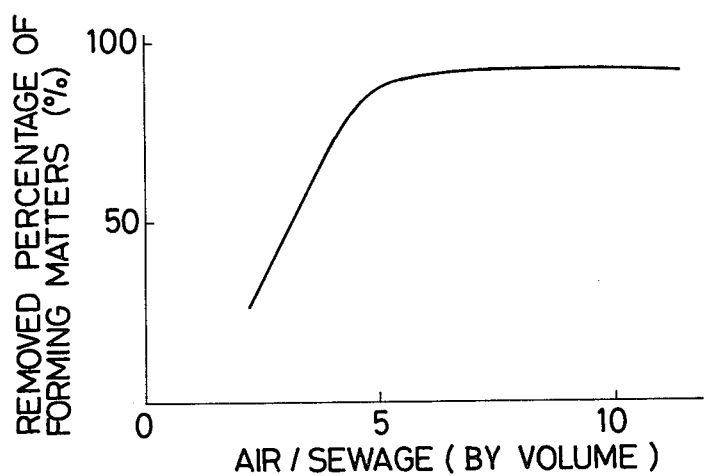
Figure 7:
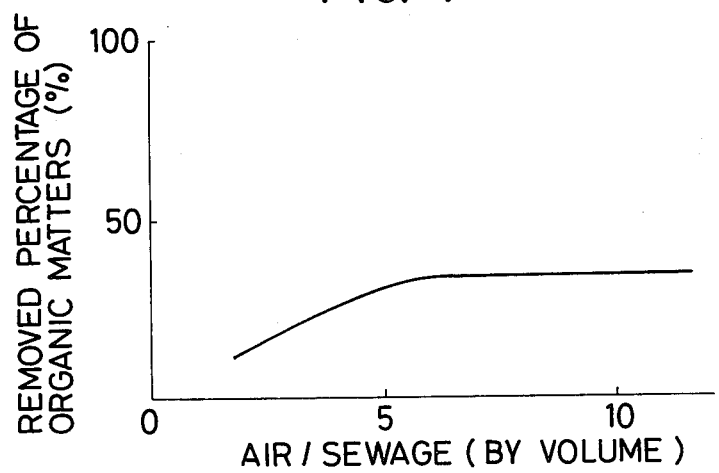

The sewage after removable of the suspended matter, one part of the foaming matter and the organic matter by the pressurizing floating-separation method in the above example is subjected to the foam floating-separation at a rate of 400 l/hr. by means of bubbles coming out from an air spray tube having bored thereon small apertures of 100 μm. The removing percentage of the foaming matter and the organic matter are measured by changing the air quantity with the results shown in FIGS. 6 and 7 respectively. As can be seen clearly from these charts, the removing percentages of the foaming matter and the organic matter improve drastically when the feed air quantity exceeds 5 times the flow quantity of the sewage. The feed air quantity is practical in the range of 3-10 times the flow quantity of the sewage and desirable in the range of about 5-10 times the flow quantity of the sewerage, but the most desirable range is 5-7 times the flow quantity of the sewage. Incidentally, the diameter of the bubbles is found to be about 1.5-3.0 mm by measurement.

Sample sewage containing 63 ppm of organic matter and 27 ppm of nitrogen compounds is fed at a rate of 400 l/hr. to a packed electrolytic tank to which 40 kg of active carbon is packed in the height of 44 cm. The linear velocity of the sewage passing through the active carbon layer is 2.1 m/hr. and its space velocity is 4.8 l/hr. at this time. The results are shown in Table 2 as explained hereinafter.

The sewage added with the flocculant (whereby the flocculant may be supplied into the processing tank directly and independently) is led into the floating zone from the lower portion of the processing tank together with the pressurized water, that is to say, the water into which the air is absorbed and dissolved under elevated pressure, whereby the suspended matter in the sewage are flocculated by the flocculant and effectively float upward while forming flocs and carrying fine air bubbles obtained by reducing the pressure of the pressurized water. By this floating operation, it is possible to cause floating and separation of more than 80% of both suspended matter and organic matter. The removing ratio of the foaming matter by this method is about 50% and the rest of the foaming matter remains unremoved. Next, the sewage is supplied from the upper portion of the second processing tank to the floating zone and brought into contact with air bubbles having a diameter in the range of 1-5 mm that come out from the air spray tube disposed at the lower portion of the tank. As a result, in addition to the floating and separation of about 50% of the suspended matter and 30% of the organic matter, about 80% of the foaming matter can be removed as foam. Since the floating and separation is effected over two-stages in this manner, it is possible to effectively remove the suspended matter, the organic matter and the foaming matter. In this instance, there are no particular limitations to the kind and the amount to be added of the flocculant. They can be suitably determined in accordance with the water quality of the sewage. Hence, it is possible to use such flocculants as polyaluminum chloride, aluminum sulfate, ferrous chloride and anionic or actionic high molecular weight fluocculants. When polyaluminum chloride is used, for example, the amount of about 200 ppm provides a sufficient effect. Of importance in this case is that the air bubbles be carried over during the process where the flocs are formed after addition of the flocculant so that the air bubbles enhance their effect not only by adsorption due to their surface tension but also by adsorption due to the flocculation. Further, in order not to break the flocs that are formed especially, it is important not to use a pump after addition of the flocculant. This is also important for improving the separation efficiency.

Table below illustrates the results of processing of the ordinary sewage using the abovementioned processing methods. Thus, it is possible to attain the water quality standard of the flush water for the flush toilet. In the tables, the suspended matter is suspensible non-dissolved matter contained in the sewage and indicate generally the matter having a granular diameter more than 0.1 μm. On the other hand, the organic matter can be divided to dissolvable organic matter and non-dissolvable organic matter present with the suspended matter. This ratio is different pursuant to the nature and the components of the sewage and, when shown by one example of a sewage, the ratio of the dissolvable organic matter and non-dissolvable organic matter is about 1 to 2.

TABLE 1

|  | Mother liquor | After pressurizing floating-separation | After foam floating-separation |
|---|---|---|---|
| suspended matter | 100 | 20 | 10 |
| organic matter | 150 | 30 | 20 |
| foaming matter | 20 | 10 | 2 |
| nitrogen compounds | 25 | 20 | 20 |
| air/sewage |  | $4 \times 10^{-4}$ | 5 |

Remarks:
unit = ppm,
The mother liquor is obtained by subjecting the ordinary sewage to the primary treatment using sand sedimentation.

In order to obtain re-use water satisfying a still wider range of applications, it is necessary to further purify the treated water obtained by the abovementioned processing. As this purification method, suitable methods may be selected in accordance with the water quality of the sewage such as adsorption and removal using active carbon or zeolite, oxidation and pastuerization using ozone, removal of the suspended matters using an ion-exchange method or a reverse osmotic membrance method.

However, the packed electrolytic floating-separation method is extremely suitable for the water re-use processing method because it is able to synthetically remove the suspended matter, the organic matter, the foaming matter, the nitrogen compounds and further metal ions. In the packed electrolytic floating-separation method, the electrically conductive porous adsorbent such as a granular active carbon layer packed in the electrolysis zone is interposed between support electrodes consisting of at least one pair of anode and cathode and when a relatively high voltage is impressed across the support electrodes from a d.c. power source, each particle of the porous adsorbent is polarized and fine bubbles (of a diameter of about 100-200 μm) of hydrogen and oxygen are formed from the surface of each particle due to the electrolysis of the water. The adsorption force and the rising flow of these bubbles enable to float and separate the suspended matter and the organic matter that are yet present in the sewage. Further, when the current is fed to the porous adsorbent layer through the sewage, the organic matter, the nitrogen compounds and the metal ions in the sewage are effectively adsorbed onto the porous adsorbent layer due to the polarizing action of the adsorbent. Hereinafter, the explanation will be given on this phenomenon.

The metal ions contained in the sewage such as calcium ion are collected by the porous adsorption layer due to electrodeposition, inorganic ions such as nitric acid ion and nitrous acid ion and ammonium ion, due to occulusion and the organic matter, due to adsorption. In the present invention, these electrodeposition, occlusion and adsorption are called "adsorption" for the sake of convenience. Due to these adsorbing actions, the surfaces (including fine pores) of the porous adsorbent are contaminated and its adsorption capacity lowers. Especially when the suspended matter and the foaming matter attach to the surface of the adsorbent, the fine pores are closed so that the adsorption capacity of the adsorbent for the organic matter and for the nitrogen compounds decreases drastically. In order to prevent this lowering, it is preferred to keep the concentration of the suspended matter in the water to be processed no greater than 20 ppm (more preferably no greater than 10 ppm) and the concentration of the foaming matters no greater than 5 ppm (more preferably no greater than 2 ppm) before carrying out the packed electrolytic floating. After operation over a predetermined period, it is also preferred to remove the suspended matter and the foaming matter by washing them off with water. In order to provide the porous adsorbent with a required adsorption capacity, it is also preferred to regenerate it by washing it with an acid or the feed of a current while a chloride is being added.

Table below illustrates the results of processing of the water after the foam floating-separation by the use of the abovementioned processing method. By this processing, the treated water can satisfy the water quality standard almost equivalent to that of the service water and can be used as the reused water for a wide range of applications.

TABLE 2

|  | After foam floating-separation | After packed electrolytic floating-separation | Water quality standard |
|---|---|---|---|
| suspended matter | 10 | up to 5 | up to 5 |
| organic matter | 20 | up to 10 | up to 10 |
| foaming matter | 2 | up to 1 | up to 1 |
| nitrogen compounds | 20 | up to 10 | up to 10 |

TABLE 2-continued

|  | After foam floating-separation | After packed electrolytic floating-separation | Water quality standard |
|---|---|---|---|
| bubble/sewage | $4 \times 10^{-4}$ | 5 | |

Remarks: unit = ppm

Upon regenerating the adsorbent by means of washings with the water, the acid and the electrolysis, the table 3 shows the component-removing performance, the operation condition and the operation frequency.

TABLE 3

| Method | | Washing with water | Washing with acid | Passing of NaCl solution | Electrolysis of NaCl solution | Water washing |
|---|---|---|---|---|---|---|
| Component-removing performance | | Washing suspended matter and foaming matter | Dissolving of metal contents | $NH_4^{-1}$ $NO_2^{-}$ N substitution | Oxidation-decomposition of organic matters | NaCl washing |
| Operation | Condition | — | $H_2SO_4$:0.5% | NaCl:5% | DC charging $7.5 \frac{A \cdot H}{Ag \cdot Ac}$ | — |
| | frequency | once/day once/week | 30 min. 30 min. | — 30 min. | — 1 hr. | — 5 hr. | — 30 min. |

Figure 8:
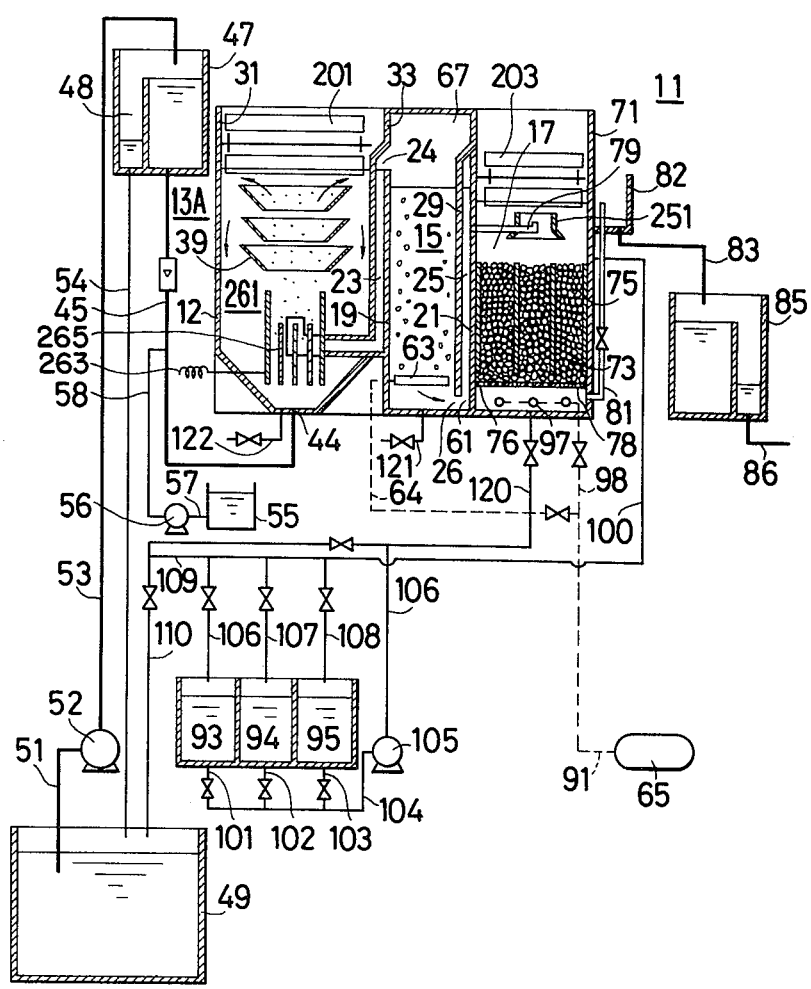
FIG. 8 is a view illustrating another system of the present invention.

FIG. 8 shows another system of the present invention. The system has almost the same components and operation, but uses an electrolysis device 261 to provide fine bubbles. The electrolysis device 261 comprises by disposing in space a plurality of electrodes 265 electrically connected with an electric source 263. By using such a electrolysis device 261, fine bubbles of 100–200 μm are produced in the tank 31. These bubbles are used for separating the suspended matter and the organic matter in the sewage by a similar way as described in FIG. 1. As can be clearly seen from FIG. 8, same elements are represented by the same numerals and the explanation will not be repeated. Thus, according to the embodiment of FIG. 8, an electrolytic floating-separation device 13A is used instead of the pressurizing floating-separation device 13. According to the embodiment of FIG. 8, since one part of water treated in the third processing is not needed to return to the electrolytic floating-separation device 13A, it will be understood that the pressurizing water production apparatus 41, the pressure reduction device 43 and the pipings therebetween are not necessary.

What is claimed is:

1. A method for a treatment of sewage comprising the steps of:
   flocculating suspended matter and organic matter in the sewage by adding flocculant to the sewage to be treated,
   firstly processing by providing first bubbles in an amount within the range of $1 \times 10^{-4}$–$1 \times 10^{-2}$ on the basis of a sewage quantity by volume and attaching flocculated suspended matter and organic matter to the bubbles to form and to float the latter as scum,
   separating and removing the scum from the sewage,
   secondly processing by separately thereafter providing second bubbles in an amount within the range of 3–10 on the basis of a sewage quantity by volume to the sewage that has passed said firstly processing step to form foam together with foaming matter in the sewage and to float the foam, and
   separating and removing the foam from the sewage.

2. A method for a treatment of sewage comprising the steps of:

flocculating suspended matter and organic matter in the sewage by adding flocculant to the sewage to be treated, firstly processing by providing first bubbles in an amount within the range of $1.5 \times 10^{-4}$–$1 \times 10^{-4}$ on the basis of a sewage quantity by volume and attaching flocculated suspended matter and organic matter to the bubbles to form and to float the latter as scum, separating and removing the scum from the sewage, secondly processing by separately thereafter providing second bubbles in an amount within the range of 5–10 on the basis of a sewage quantity by volume to the sewage that has passed said firstly processing step to form foam together with foaming matter in the sewage and to float the foam, and separating and removing the foam from the sewage.

3. A method for a treatment of sewage comprising the steps of:

flocculating suspended matter and organic matter in the sewage by adding flocculant to the sewage to be treated, firstly processing by providing first bubbles in an amount within the range of $2 \times 10^{-4}$–$4 \times 10^{-4}$ on the basis of a sewage quantity by volume and attaching flocculated suspended matter and organic matter to the bubbles to form and to float the latter as scum, separating and removing the scum from the sewage, secondly processing by separately thereafter providing second bubbles of 5–7 on the basis of a sewage quantity by volume to the sewage that has passed said firstly processing step to form foam together with foaming matter in the sewage and to float the foam, and separating and removing the foam from the sewage.

4. A method for a treatment of sewage of claim 3, wherein said firstly processing step provides the bubbles with a bubble average diameter of 50–150 $\mu$m, said secondly processing step providing the bubbles with a bubble average diameter of 1.5–3 mm, thirdly processing by thereafter providing third bubbles in an amount within the range of $0.5 \times 10^{-4}$–$2 \times 10^{-4}$ on the basis of a sewage quantity to attach the suspended matter and the organic matter remained in the sewage to the bubbles and to float the latter as scum, and separating and removing the scum from the sewage, said thirdly processing step including adsorbing nitrogen compounds and organic matter remained in the sewage by passing the sewage through a bed of porous adsorbent polarized by the feed of electric current to the adsorbent, by passing the sewage downwardly through the bubbles to first form the scum that is floated upwardly and thereafter moving the sewage downwardly through the bed of adsorbent, and said thirdly processing step further including generating said third bubbles by electrolysis resulting from the current being fed to the adsorbent, with the bubbles having a diameter within the range of 100–200 $\mu$m.

5. A method for a treatment of sewage of claim 4, wherein said firstly processing step provides the first bubbles at least 10 seconds after the flocculant was added to the sewage.

6. A method for a treatment of sewage of claim 1, wherein said firstly processing step provides the first bubbles at least 10 seconds after the flocculant was added to the sewage.

7. A method for a treatment of sewage comprising the steps of:

flocculating suspended matter and organic matter in the sewage by adding flocculant to the sewage to be treated, firstly processing by providing first bubbles, produced by reducing pressure of pressurized water that has dissolved air, in an amount within the range of $1 \times 10^{-4}$–$1 \times 10^{-2}$ on the basis of a sewage quantity by volume and attaching flocculated suspended matter and organic matter to the bubbles to form and to float the latter as scum, separating and removing the scum from the sewage, secondly processing by separately thereafter providing second bubbles through an air spray device in an amount within the range of 3–10 on the basis of a sewage quantity by volume to the sewage that has passed said firstly processing step to form foam together with foaming matter in the sewage and to float the foam, and separating and removing the foam from the sewage.

8. A method for a treatment of sewage of claim 7, comprising steps of:

thereafter thirdly processing by adsorbing nitrogen compounds and organic matter remaining in the treated sewage by passing the sewage through a bed of porous adsorbent polarized by the feeding of electric current to the adsorbent, conducting re-use water taken out through the thirdly processing step to a pressurizing water production apparatus, dissolving air into the re-use water, and providing the re-use water that has dissolved air to the first processing step as said pressurized water.

9. A method for a treatment of sewage comprising the steps of:

flocculating suspended matter and organic matter in the sewage by adding flocculant to the sewage to be treated, firstly processing by providing first bubbles, produced through electrolysis, in an amount within the range of $1 \times 10^{-4}$–$1 \times 10^{-2}$ on the basis of a sewage quantity by volume to attach flocculated suspended matter and organic matter to the bubbles and to float the latter as scum, separating and removing the scum from the sewage, secondly processing by separately thereafter providing second bubbles, transferred through an air spray device, in an amount within the range of 3–10 on the basis of a sewage quantity by volume to the sewage that has passed said firstly processing step to form foam together with foaming matter in the sewage and to float the foam, and separating and removing the foam from the sewage.

10. A method for a treatment of sewage of claim 9, comprising a step of thereafter thirdly processing by adsorbing nitrogen compounds and organic matter remaining in the treated sewage by passing the sewage through a bed of porous adsorbent polarized by the feeding of electric current to the adsorbent.

11. A method for a treatment of sewage comprising the steps of:

flocculating suspended matter and organic matter in the sewage by adding flocculant to the sewage to be treated, processing by providing bubbles, having a bubble average diameter of 50-200 μm, in an amount within the range of $1\times10^{-4}$–$1\times10^{-2}$ on the basis of a sewage quantity by volume to the sewage having the flocculant to attach flocculated suspended matter and organic matter to the bubbles and to float the latter as scum, separating and removing the scum from the sewage, thereafter processing by providing bubbles, having a bubble average diameter of 1-5 mm, in an amount within the range of 3-10 on the basis of a sewage quantity by volume to the sewage to form foam together with foaming matter in the sewage and to float the foam, and separating and removing the foam from the sewage.

12. A method for a treatment of sewage of claim 11, wherein one or more of the materials selected from the group consisting of polyaluminum chloride, aluminum sulfate, ferrous chloride and anionic or actionic high molecular weight flocculants are used as the flocculant.

13. A method for a treatment of sewage comprising the steps of:

flocculating suspended matter and organic matter in the sewage by adding flocculant to the sewage to be treated, firstly processing by providing first bubbles in an amount within the range of 3-10 on the basis of the sewage quantity by volume to form foam together with foaming matter in the sewage and to float the foam, separating and removing the foam, secondly processing by providing second bubbles in an amount within the range of $1\times10^{-4}$–$1\times10^{-2}$ on the basis of a sewage quantity to the firstly processed sewage in order to attach the suspended matter and organic matter flocculated in the sewage to the bubbles and to float the latter as scum, and separating and removing the scum and taking out the treated sewage.

14. A method for a treatment of sewage of claim 13, wherein the first bubbles have a bubble average diameter of 1-5 mm and the second bubbles have a bubble average diameter of 100-200 μm.

15. A method for a treatment of sewage comprising the steps of:

flocculating suspended matter and organic matter in the sewage by adding flocculant to the sewage to be treated, firstly processing by providing first bubbles in an amount within the range of $1\times10^{-4}$–$1\times10^{-2}$ on the basis of a sewage quantity by volume to attach flocculated suspended matter and organic matter to the bubbles and to float the latter as scum, separating and removing the scum from the sewage, secondly processing by thereafter providing second bubbles in an amount within the range of 3-10 on the basis of a sewage quantity by volume to the sewage that has passed said firstly processing step to form foam together with foaming matter in the sewage and to float the foam, separating and removing the foam from the sewage, thirdly processing by thereafter providing third bubbles in an amount within the range of $0.5\times10^{-4}$–$2\times10^{-4}$ on the basis of a sewage quantity to attach the suspended matter and the organic matter remained in the sewage to the bubbles and to float the latter as scum, and separating and removing the scum from the sewage and thereafter taking out the sewage.

16. A method for a treatment of sewage comprising the steps of:

flocculating suspended matter and organic matter in the sewage by adding flocculant to the sewage to be treated, firstly processing by providing first bubbles in an amount within the range of $1\times10^{-4}$–$1\times10^{-2}$ on the basis of a sewage quantity by volume to attach flocculated suspended matter and organic matter to the bubbles and to float the latter as scum, separating and removing the scum from the sewage, secondly processing by thereafter separately providing second bubbles in an amount within the range of 3-10 on the basis of a sewage quantity by volume to the sewage that has passed said firstly processing step to form foam together with foaming matter in the sewage and to float the foam, separating and removing the foam from the sewage, thirdly processing by thereafter separately adsorbing nitrogen compounds and the organic matter remained in the sewage by passing the sewage through a bed of porous adsorbent polarized by the feed of electric current to the adsorbent.

17. A method for a treatment of sewage of claim 16, comprising a step of regenerating the adsorbent.

* * * * *